US007231044B2

(12) United States Patent
Dube

(10) Patent No.: US 7,231,044 B2
(45) Date of Patent: Jun. 12, 2007

(54) METHOD AND APPARATUS FOR REAL-TIME DIGITAL CERTIFICATION OF ELECTRONIC FILES AND TRANSACTIONS USING ENTROPY FACTORS

(75) Inventor: Roger R. Dube, Boca Raton, FL (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 971 days.

(21) Appl. No.: 09/948,730

(22) Filed: Sep. 7, 2001

(65) Prior Publication Data

US 2002/0199103 A1 Dec. 26, 2002

Related U.S. Application Data

(60) Provisional application No. 60/239,501, filed on Oct. 11, 2000, provisional application No. 60/245,491, filed on Nov. 3, 2000.

(51) Int. Cl.
*H04L 9/00* (2006.01)

(52) U.S. Cl. .................. 380/258; 380/35; 380/46; 380/262; 380/268; 380/270; 726/7; 726/19; 726/30; 713/168; 713/170; 713/176; 713/180

(58) Field of Classification Search ................ 380/258; 713/168

See application file for complete search history.

(56) References Cited

U.S. PATENT DOCUMENTS 4,463,357 A 7/1984 MacDoran (Continued)

FOREIGN PATENT DOCUMENTS

DE 197 50 522 A 1 11/1997

OTHER PUBLICATIONS

Candebat, T., et al, "The Orient Platform: A Secure Infrastructure for Location Based Services on the Internet", 2003, School Computer Applns., Dublin City Univ., entire doc., www.computing.dcu.ie/~cameron/research/publications/iei_ieee_itsrs_2003.pdf.*

(Continued)

*Primary Examiner*—Nasser Moazzami
*Assistant Examiner*—Ronald Baum
(74) *Attorney, Agent, or Firm*—Patent Venture Group

(57) ABSTRACT

An invention for digital authentication is provided. A first timing signal is received from a remote source using a receiver. Next, a delay number is stored. The delay number is based on a first delay time period between when the first timing signal was transmitted and when the first timing signal was received. A digital transaction is then authenticated using the delay number. In one aspect, a digital certificate is created using the delay number. The remote source can be any source capable of generating timing signals, such as a global positioning satellite (GPS) system or a cell tower system. The delay in the timing signal can be caused by free electrons in a line of sight between the remote source and the receiver, such as by variations in atmospheric conditions or by an object within the line of sight such as bird or tree branch. Optionally, the delay number can be stored on a User Card and a System Card. In this aspect, a transaction between the User Card on a client computer and the System Card on a server computer can be authenticating by comparing the delay number stored on the User Card to the delay number stored on the System Card.

35 Claims, 9 Drawing Sheets

U.S. PATENT DOCUMENTS

| | | | |
|---|---|---|---|
| 5,111,504 A | | 5/1992 | Esserman et al. |
| 5,412,730 A | * | 5/1995 | Jones .......................... 380/46 |
| 5,469,506 A | | 11/1995 | Berson et al. |
| 5,659,617 A | * | 8/1997 | Fischer ....................... 380/258 |
| 5,754,657 A | * | 5/1998 | Schipper et al. ............ 380/258 |
| 5,757,916 A | * | 5/1998 | MacDoran et al. ......... 380/258 |
| 5,895,436 A | | 4/1999 | Savoie et al. |
| 5,898,680 A | | 4/1999 | Johnstone et al. |
| 6,175,922 B1 | * | 1/2001 | Wang ......................... 713/182 |
| 6,240,183 B1 | | 5/2001 | Marchant |
| 6,307,937 B1 | | 10/2001 | Dillon et al. |

OTHER PUBLICATIONS

Denning, D., et al, "Location-Based Authentication: Grounding Cyberspace for Better Security", Feb. 1996, Computer Fraud & Security, Elsevier Science, Ltd., entire doc., www.cs.georgetown.edu/~denning/infosec/Grounding.txt.*

Fischer, Viktor, et al, 'Simple PLL-Based True Random Number Generator for Embedded Digital Systems', IEEE workshop on Design and Diagnostics of Electronic Circuits and Systems, Apr. 18-21, 2004, entire document, www.best.tuke.sk/simka/download/pub/fis_dru_sim_cel_04.pdf.*

B. Schneier, "*Applied Cryptography Second Edition*- Protocols, algorithms, and source code in C", p. 31-54, XP-002952211, Oct. 18, 1995, John Wiley & Sons, Inc., Canada.

* cited by examiner

METHOD AND APPARATUS FOR REAL-TIME DIGITAL CERTIFICATION OF ELECTRONIC FILES AND TRANSACTIONS USING ENTROPY FACTORS

CROSS REFERENCE TO RELATED APPLICATIONS

This application claims the benefit of (1) U.S. Provisional Patent Application having Ser. No. 60/239,501, filed on Oct. 11, 2000, entitled "Method and Apparatus for Real-Time Digital Certification of Electronic Files and Transactions," and (2) U.S. Provisional Patent Application having Ser. No. 60/245,491, filed on Nov. 3, 2000, entitled "Method and Apparatus for Real-Time Digital Certification of Electronic Files and Transactions Using Entropy Factors." Each of these provisional applications is hereby incorporated by reference.

BACKGROUND OF THE INVENTION

1. Field of the Invention

This invention relates generally to digital transaction authentication, and more particularly to digital certification of files and transactions using entropy factors.

2. Description of the Related Art

The use of public and private networks has fundamentally altered the manner in which business enterprises and government agencies communicate and conduct business. For example, the Internet, intranets and extranets are used to store, analyze and transmit information between and within organizations, and permit interactive, local, national or global communication on a real-time basis. Moreover, these networks are now used for electronic business-to-customer retail commerce and for electronic business-to-business commerce of all types.

In order to achieve its fall potential, however, e-commerce must overcome numerous security and related issues, including concerns relating to hacker attacks, merchant impersonation, data confidentiality and integrity, fraud, and transaction repudiation. Key to all of these problems is the need to authenticate a user's identity in a manner that is extremely difficult or impossible to defeat.

To improve the confidentiality of communications and commerce over networks, public key infrastructure ("PKI") encryption systems have been developed. Using PKI encryption, digital messages are encrypted and decrypted using ciphers or keys. FIG. 1 is an illustration showing a conventional public and private key pair 100. The public and private key pair includes a public key 102 and a private key 104. Each user of the system has a public key 102 and a private key 104 and must know the public key 102 of the intended recipients of its messages. In general, a message is encrypted and sent by a sender using the recipient's public key 102 and is then received and decoded by the recipient using his private key 104, as discussed in greater detail next.

FIG. 2 is an illustration of a conventional PKI system 200. In FIG. 2, two network computer users, Alice 202 and Bob 204, each have their own public and private key pair. Specifically, Alice 202 has a public and private key pair comprising a public key 206 and a private key 208. Similarly, Bob 204 has a public and private key pair comprising a public key 210 and a private key 212. The private keys 208 and 212 are secret numbers to which only the owner has access. In general each public is generated using the following formula:

$$G^x \bmod P, \qquad (1)$$

where G and P are large prime numbers and x is the user's private key. In this manner, eavesdroppers would have great difficulty determining x even if the values of G and P are known. Hence, the public keys 206 and 210 can be broadly disseminated without revealing the related private key. For example, Bob 204 and Alice 202 provide their public keys 210 and 206 to each other prior to initiation of encrypted communication.

Thereafter, whenever encrypted communication is to occur, the sender utilizes their private key in conjunction with the recipient's public key to encrypt the data being sent. Upon receipt, the recipient decrypts the data using the recipient's private key. For example, when Alice 202 wishes to send Bob 204 an encrypted message, Alice 202 encrypts the message using her private key 208 in conjunction with Bob's public key 210. Upon receipt, Bob decrypts the message using his private key 212.

PKI systems attempt to provide a high level of security and confidentiality because messages can be decoded only by persons having the recipient's private key. However, it is well known in the industry that a weakness of PKI technology is its susceptibility to the "man-in-the-middle" attack.

FIG. 3 is an illustration showing a PKI system 300 compromised by a middleman. In particular, FIG. 3 illustrates three network computer users, Alice 202, Bob 204, and Cindy 302, who in this example is the middleman. As in FIG. 2, Alice 202 has a public and private key pair comprising public key 206 and private key 208, and Bob 204 has a public and private key pair comprising public key 210 and private key 212. In addition, Cindy 302, the middleman, has a public and private key pair comprising public key 304 and private key 306. If Cindy 302 can intercept a transmission between Bob 204 and Alice 202, she can trick them into using her public key 304. In this attack, the attacker intercepts the transmission of a public key and replaces it with the attacker's false key, thereby effectively replacing the true sender as the trusted party. This enables the attacker to send, receive and decode messages intended for the original legitimate user.

For example, during a "man-in-the-middle" attack, Cindy 302 intercepts Alice's public key 206 and replaces it with Cindy's public key 304. Similarly, Cindy 302 intercepts Bob's public key 210 and replaces it with Cindy's public key 304. Bob 204 and Alice 202 each believe they have each other's public key, however, they actually have Cindy's public key 304. Later, during encrypted transmissions, both Alice 202 and Bob 204 unknowingly use Cindy's public key 304 in conjunction with their respective private keys to encrypt messages to each other, which are actually intercepted by Cindy 302. Cindy 302 can decrypt the messages using her private key 306, and further, re-encrypt the messages using Cindy's private key 304 and the proper recipient's public key 206 and 210.

Alternatively, an attacker can also submit false public key entries to certificate managers and effectively masquerade as another person. The implementation and use of PKI technology over remote sites without independent verification of identity poses many risks and must be used judiciously.

As described above, PKI encryption systems do not provide assurance as to the authenticity of the sender. An attempt has been made to address this problem through use of digital certification systems that use public and private keys to create special files, or digital certificates or signatures. The digital certificates are encoded using a sender's private key and, upon receipt, decoded by the recipient using a copy of the sender's public key obtained from a remote trusted administrator. For example, a certification authority (CA), which confirms the identity of the sender through transmissions over the Internet or other network, can be used to disseminate public keys.

Certifying authorities generally are either public or private. Public certifying authorities are independent third parties that issue digital certificates for use in Internet applications, after conducting due diligence as to the identity of the subscriber. Private certifying authorities are entities that issue their own digital certificates, often to closed communities of users, such as customers or employees, for use in Internet, intranet, extranet or other applications.

However, the Certifying Authority approach has numerous flaws and loopholes. For example, it is well known in the PKI industry that a person can create a key pair and claim to be someone else. By inserting an unauthorized public key in a transaction or on a public database, the masquerading party creates ambiguity and can receive encrypted files intended for the person he is impersonating. This flaw, combined with a lack of location and apparatus ID information, makes detection of the identity deception extremely difficult.

Remote certifying authority technologies are fundamentally self-limiting. As explained above, remote certifying authorities use multiple transmissions over the Internet to receive, certify, and then deliver digital certificates. There are at least three Internet transmissions of information for each digital certificate created, including the original request for a certificate, the delivery of a certificate to the initiator, and the transmission of the original document and certificate to the final intended recipient. Moreover, should the recipient want to certify his receipt, three additional transmissions must occur. As more users rely upon remote certifying authorities for digital certificates, the demand for Internet bandwidth will increase geometrically, ultimately slowing the system down. The more the system is used, the slower it will become, causing users to turn away from CA technology. Due to this self-limiting property, it is unlikely that remote certifying authority technologies will ever become the universal standard for identity authentication.

Moreover, revocation of privileges and identity authentication are not immediate using CA technology. Since libraries of public keys are storied in multiple databases that reside on the servers of multiple Certifying Authorities, a significant delay exists between the time that a service elects to revoke key privileges and the time that the revocation information has fully propagated to all possible public key databases and servers. More and more large organizations are recognizing that the maintenance of current information about authorized and unauthorized personnel across multiple remote CA's is a daunting task, which is further complicated by the fact that a person whose credentials have been revoked may continue to have access privileges until the revocation propagation is complete. This raises security concerns about sensitive data being exposed to dismissed or disgruntled employees whose credentials have been revoked. In the today's CA system, those employees have measurable time in which they may continue to access sensitive information against the will of their employer.

Commercial applications have a need for a verifiable means to demonstrate the occurrence of a particular e-commerce transaction or Internet communication, in order to reduce the risk of fraud or repudiation of a transaction or communication by the parties. This need is present in the case of existing e-commerce applications, and will increase as e-commerce expands with the offering of additional software packages over the Internet through application service providers (ASPs) and the offering of additional material that is copyright protected (e.g., CD quality sound, video and images.)

A key to continuing e-commerce growth is an incontestable witness to a connection, download, file-creation or transmission that will create security of audit trails and transaction records. The common elements required to solve these problems include time and authenticated user location. Although it is necessary to record file activity on the receiving computer system, non-repudiation of a transaction requires recordation of the same file activity on the sender's computer system as well. Independent witnessing of time and location of events provides this non-repudiation.

Existing Remote Certifying Authorities attempt to identify both a specific document and the signer of the document, but these technologies cannot identify the exact time when a document or signature was created (as distinguished from when a document is received) because the time in a computer can be altered. Moreover, remote certification with a CA over the Internet or other network requires delay and transmission time, thereby preventing exact time confirmation. Existing attempts to deal with the problem of real-time verification are not effective because assurance is given only as to the time of document receipt, not creation.

A number of attempts have been made to increase system security in the prior art. The following is a list of prior art disclosures that provide some form of system security. However, as will be seen, none of the disclosures provides a level of security currently needed to ensure proper protection of today's highly sensitive transaction data.

Hissle et. al, in PCT publication WO 97009802, describe a method in which the timestamp for a document is authenticated using a remote source of time such as GPS. Since the GPS satellite system has an independent and redundant source of time and date, the remote time can be compared to the local system time as a means of authenticating the system time and therefore the time of creation of a document. The external and local times are then compared and if the difference exceeds a preset range, the internal clock is updated. The disclosure further describes the creation of a digital timestamp or signature in which the authenticated time is combined with a summary of the file and the processor ID to provide authentication of the file's creation time. The concern here is that the system does not include the location of the file at its time of creation nor the identity of the user.

Murphy, in U.S. Pat. No. 5,640,452, discloses a method in which the location of a decryption chip is employed to restrict access to a broadcast signal. The location is determined locally by a GPS receiver and is compared against the authorized location set at the time of installation. For example, a digital satellite receiver dish could employ this technology to assure that clones of the decryption chip will not operate at any location other than that originally licensed, since their location will be incorrect. This technology does not authenticate the user in any way, nor does it authenticate the GPS location through any independent means. It further suffers from the fact that since the location detector sends an enabling signal to the decryption chip, the system will likely be defeated by insertion of the proper enabling signal, thereby bypassing the location requirement.

Loomis et. al., in U.S. Pat. No. 6,092,193, disclose a method for authenticating accumulated instrument data in which a summary of the data sampled at pre-set times are compiled in a sequential fashion and encrypted each time the total exceeds a pre-set value. By comparing the decrypted totals to the current total of the data in memory, alterations to the data can be detected and therefore declared invalid. The disclosure does not employ location, nor does it authenticate the user in any way in order to control access.

Schipper et. al., in U.S. Pat. No. 5,754,657, describe a process by which a message source is authenticated by its location. In this patent, the inventors employ a process by which the source of the message receives its location using GPS and appends a portion of that raw signal to the data. Part or all of the combined message can be encrypted. The signal is decrypted upon receipt, and the receiver uses the raw GPS signals to determine whether or not the source resides at its pre-authorized location. Unfortunately, a synthesized or pre-recorded GPS signal stream could be employed to facilitate masquerading by an unauthorized source.

In U.S. Pat. No. 5,757,916, MacDoran et. al. disclose a technique by which the raw satellite signals from a source computer are transmitted to a remote server that requires authentication. The MacDoran disclosure further employs a second source computer that also sends its raw GPS signals to the server. The server uses the raw signals from both sources to calculate their respective locations, which are compared against locations stored in the profiles for the two sources. In addition, a differential location vector is calculated from the raw signals, and this differential vector is also compared against the profiles to determine that it is consistent with the two authorized locations. In principle, since the satellites are continually moving and the calculations are performed on signals from two nearby locations, spoofing of the original source signal would be difficult. This system introduces the additional complication that an authenticated third party (the second source) must be on-line, receiving signals, and available for transmission in order to authenticate the first source. Availability of authentication and privacy of the two sources are concerns that surface here.

In view of the foregoing, there exists a need for enhanced authentication of the identity of a person initiating an electronic transaction, electronic file, document, or accessing an electronic file, document, or database. In order to avoid opportunities for interception, masquerading, "man-in-the-middle" attacks, and other forms of electronic fraud, there is also a need that such authentication not require any transmission of information to a remote third party, commonly referred to as "remote certifying authorities." Furthermore, such authentication should preferably occur on a real-time basis, at the time of the transaction, file creation, or data access. Moreover, such authentication should preferably include location information that can be independently certified. Location information alone, although valuable, is not sufficient. Thus, the location should be authenticated to eliminate any possibility of location spoofing.

SUMMARY OF THE INVENTION

Broadly speaking, the present invention fills these needs by providing digital authentication using random, unpredictable delays in the timing signals (caused by variations in the atmosphere and other intervening objects in the line of sight) as a source of random numbers. In one embodiment, a method for digital authentication is disclosed. A first timing signal is received from a remote source using a receiver. Next, a delay number is stored. The delay number is based on a first delay time period between when the first timing signal was transmitted and when the first timing signal was received. A digital transaction is then authenticated using the delay number. In one aspect, a digital certificate is created using the delay number. The remote source can be any source capable of generating timing signals, such as a global positioning satellite (GPS) system or a cell tower system. The delay in the timing signal can be caused by free electrons in a line of sight between the remote source and the receiver, such as by variations in atmospheric conditions or by an object within the line of sight such as bird or tree branch. Optionally, the delay number can be stored on a User Card and a System Card. In this aspect, a transaction between the User Card on a client computer and the System Card on a server computer can be authenticated by comparing the delay number stored on the User Card to the delay number stored on the System Card. Also optionally, the delay number stored on the User Card can be updated based on a second delay time period between when a second timing signal from the remote source was transmitted and when the second timing signal was received. Further, the delay number stored on the System Card can be updated based on the updated delay number stored on the User Card. In addition, a mobile access code can be received when the location of the User Card does not match location data in a profile, and the transaction further authenticated by comparing the received mobile access code with a mobile access code data from the profile.

A further method for digital authentication is disclosed in another embodiment of the present invention. In this embodiment, a profile is stored on a System Card. The profile includes a first delay number based on a first measurement of delays of one or more timing signals received from one or more remote sources. Next, a digital token is transmitted from a User Card to the System Card, where the digital token includes the first delay number. A new server public encryption key is sent from the System Card to the User Card if the contents of the digital token matches the profile. Summary data is then communicated from the User Card to the System Card. The summary data includes a second delay number based on a second measurement of delays of one or more timing signals received from the remote sources, and is encrypted via the new server public encryption key. The profile on a System Card is then updated such that the profile includes the second delay number. In one aspect, the digital token is encrypted for transmission using a default server public encryption key, and the new server public encryption key is encrypted for transmission using the default server public encryption key. As above, the remote source can be any source capable of generating external timing signals, such as a global positioning satellite (GPS) system. Further, the profile can include location data for the User Card, and a location of the User Card can be calculated based on the second measurement of the timing signals, which location can then be included in the digital token.

A system for digital authentication is disclosed in a further embodiment of the present invention. The system includes a client computer having a User Card capable of receiving a first measurement of timing signals received from one or more remote sources. The User Card stores a delay number based on a first measurement of delay of the first timing signals. In addition, a server computer having a System Card that stores the delay number is included in the system. The System Card authenticates a transaction between the client computer and the server computer by comparing the delay number stored on the User Card to the delay number stored on the System Card. Generally, the transaction is allowed to occur if the authentication is successful. Optionally, the User Card can update the delay number stored on the User Card based on a second measurement of delay of second timing signals received from the remote sources. Further, the System Card can update the delay number stored on the System Card based on the updated delay number stored on the User Card. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for real-time digital certification of electronic files and transactions using entropy factors. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

In order to provide a thorough understanding of the present invention, two devices are defined. The first device, a "User Card", resides on a client computer system, disk drive or other electronic device that is employing the present invention. The term "card" is used figuratively and is not meant to limit the implementation or packaging of the present invention in any way. This User Card may reside entirely within a host device, may be plugged in to a host device, or otherwise electronically attached to the device through any one or more attachment means, such as PCMCIA connector, serial port, parallel port, wireless connection, or other means. It will be apparent to those skilled in the art that these attachment means are intended to present examples and not intended to limit the present invention in any way. The second device, the "System Card", resides on the server computer system or other host which is controlling access to information and requires authentication of a user.

Figure 1:
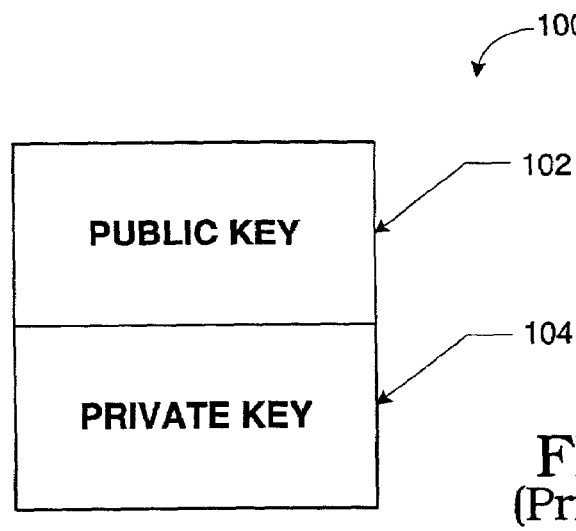
FIG. 1 is an illustration showing a conventional public and private key pair.
Figure 2:
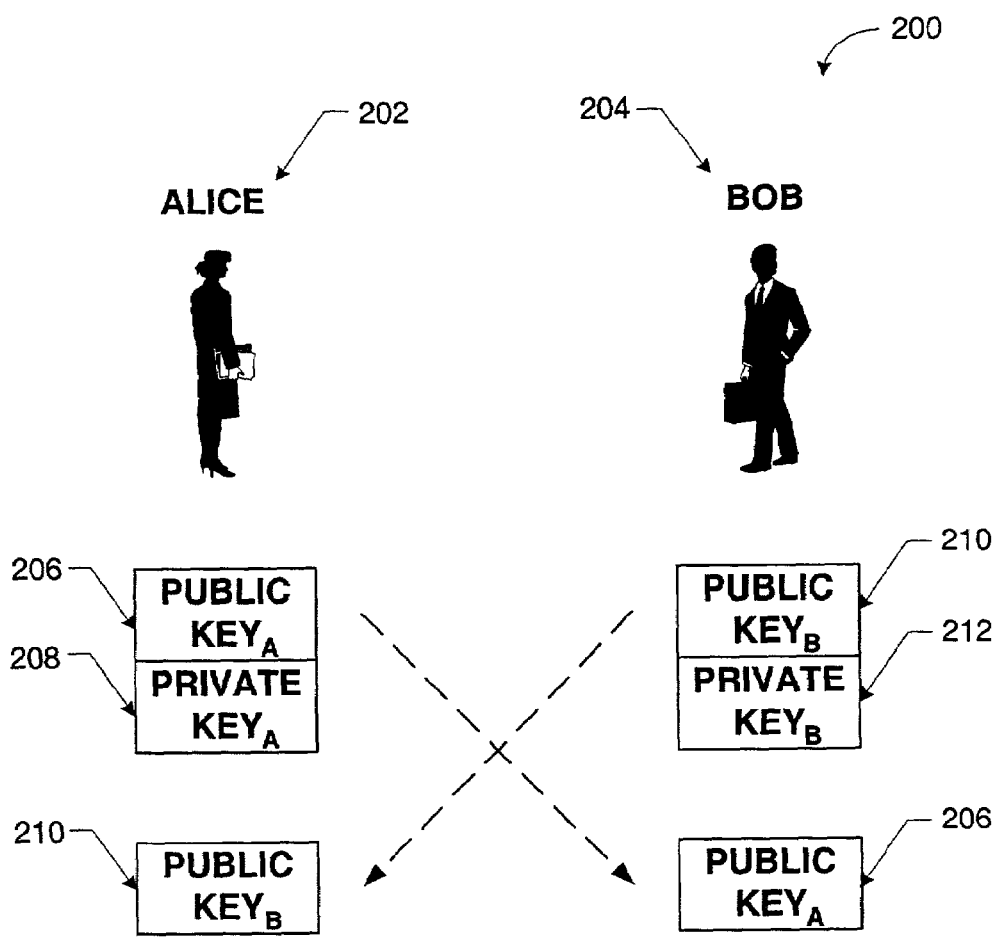
FIG. 2 is an illustration of a conventional PKI system.
Figure 3:
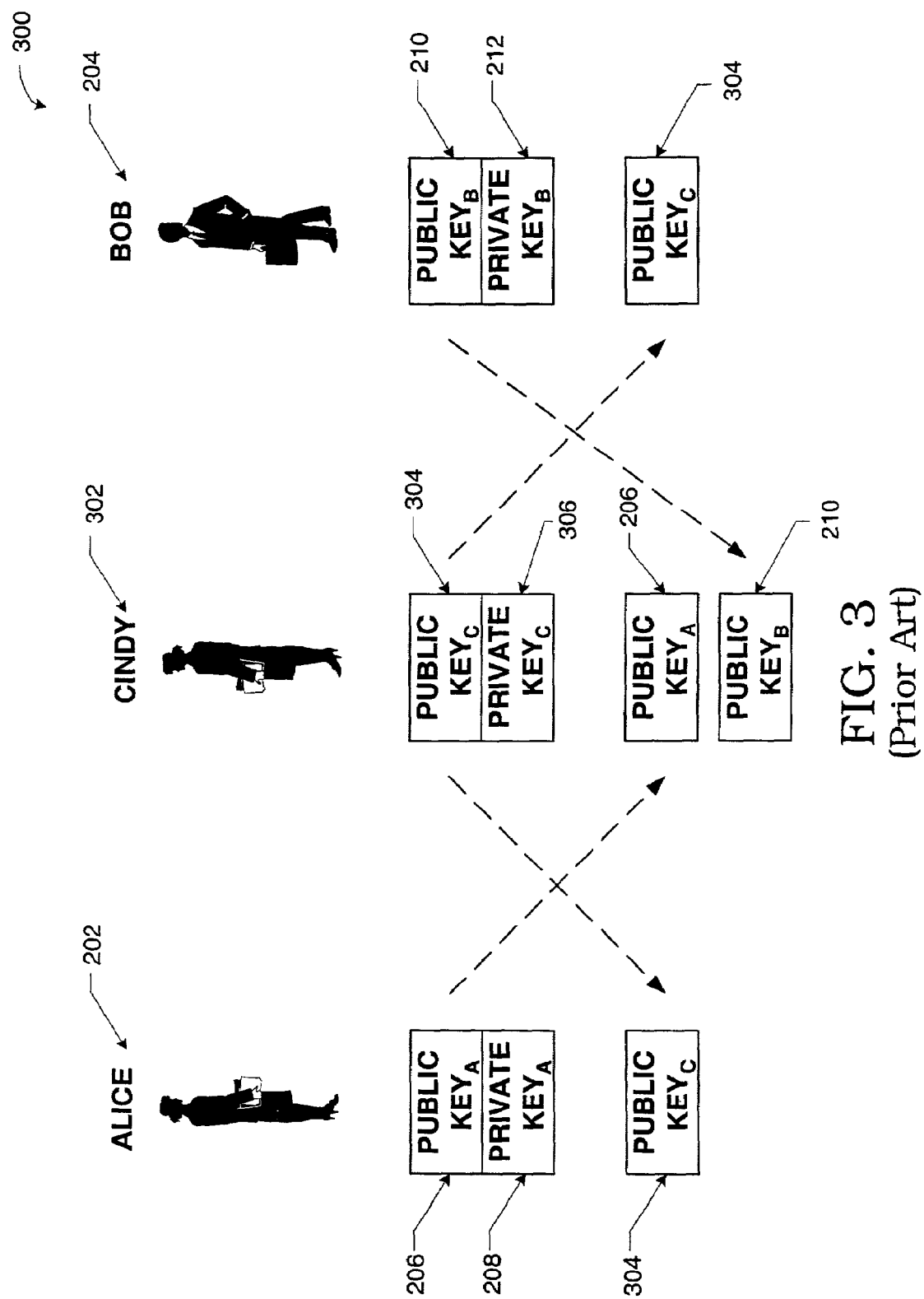
FIG. 3 is an illustration showing a PKI system compromised by a middleman.
Figure 4:
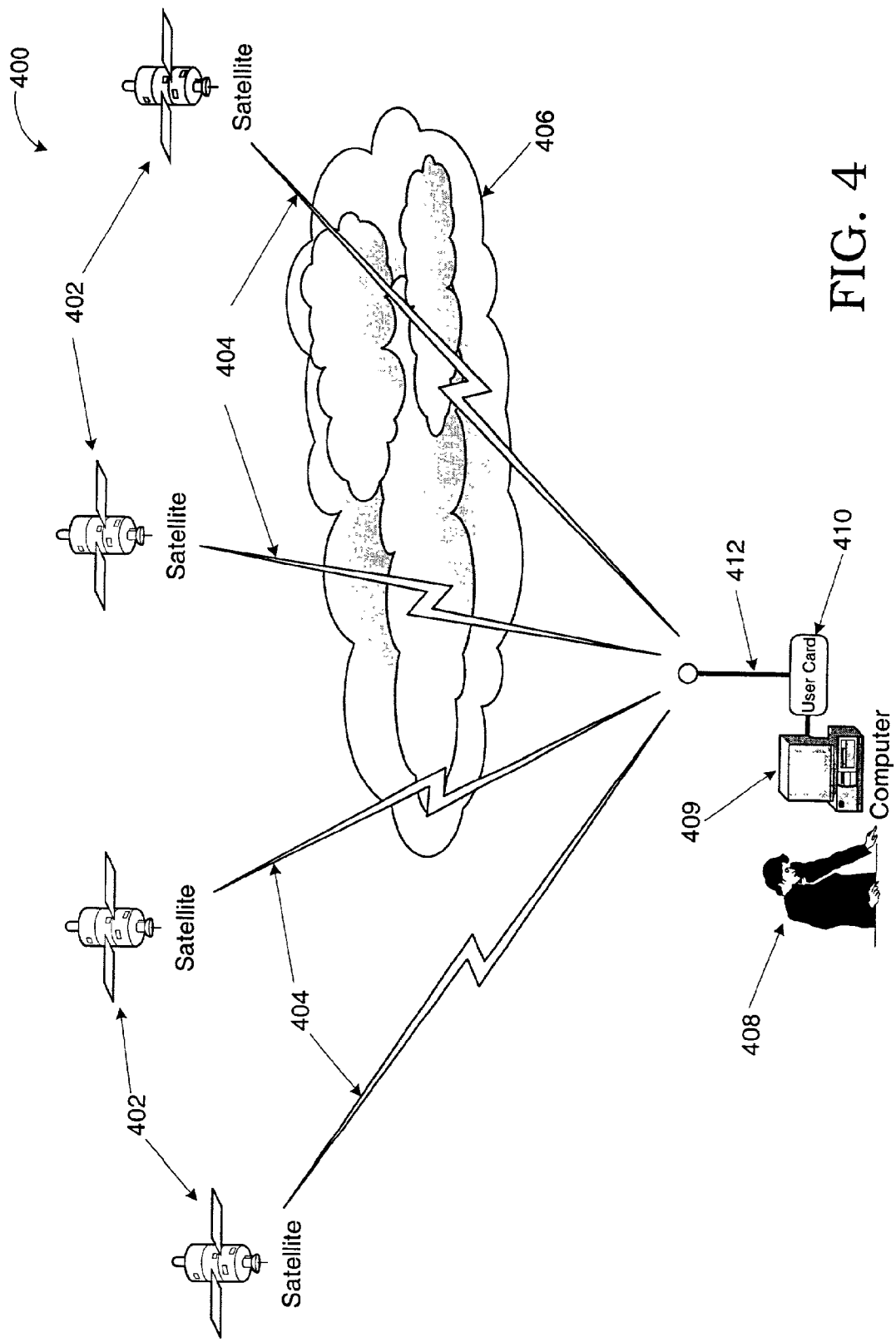
FIG. 4 is an illustration showing a client computer system that utilizes GPS data to facilitate authentication, in accordance with an embodiment of the present invention.

FIGS. 1, 2, and 3 have been described in terms of the prior art. FIG. 4 is an illustration showing a client computer system 400 that utilizes GPS data to facilitate authentication, in accordance with an embodiment of the present invention. The client computer system 400 includes a GPS antenna 412 on a User Card 410, which is coupled to a client computer 409 operated by a user 408. Typically, the client computer 409 is further coupled to a network, which can be either a local area network (LAN) or a wide area network (WAN) such as the Internet. In addition, FIG. 4 shows satellites 402 of the GPS system, each providing timing signals 404, usually broadcast at 1.75 Ghz, that are received by the User Card 410 through the GPS antenna 412. The GPS system is a set of 24 satellites launched by the U.S. Department of Defense that are configured to facilitate identifying earth locations. Although the following description is in terms of GPS technology, it should be noted that any external timing signals can be utilized by the embodiments of the present invention. Further exemplary external timing signals include cell towers, LORAN, and Global Orbiting Navigational Satellite systems (GLONASS). Moreover, timing pulses over the Internet may be utilized as timing signals by the embodiments of the present invention.

In order to authenticate a transaction, the embodiments of the present invention place a person ("who") in time ("when") and in space ("where") as part of a transaction ("what"). As illustrated in FIG. 4, embodiments of the present invention utilize GPS data to facilitate authentication of a transaction. Each satellite 402 generates timing signals 404 that are received by the GPS antenna 412 and the User Card 410. The User Card 410 includes, among other things, the GPS antenna 412 and electronics that process these timing signals 404 to provide geophysical coordinates (longitude, latitude and altitude) which is subsequently used as part of the authentication process. The processing of these timing signals occurs independently and asynchronously from the client computer or host device 409.

The timing signals 404 include encoded time and date information that can be extracted by the User Card 410 and/or the client computer 409, as will be apparent to those skilled in the art. Further, by triangulation of signals from three of the satellites 410, the User Card 410 can pinpoint the current geophysical location of the computer anywhere on earth, generally to within a few meters. However, variations in the ionosphere and atmosphere 406 due to weather, barometric pressure, solar activity, and other variable and unpredictable parameters cause the purity of the timing signals 404 to fluctuate. In particular, the variations in the ionosphere and atmosphere cause unpredictable delays in the timing signals 404. To compensate for these variances, each satellite 402 of the GPS system transmits two timing signals 404 at two different frequencies (L1 and L2).

Figure 5:
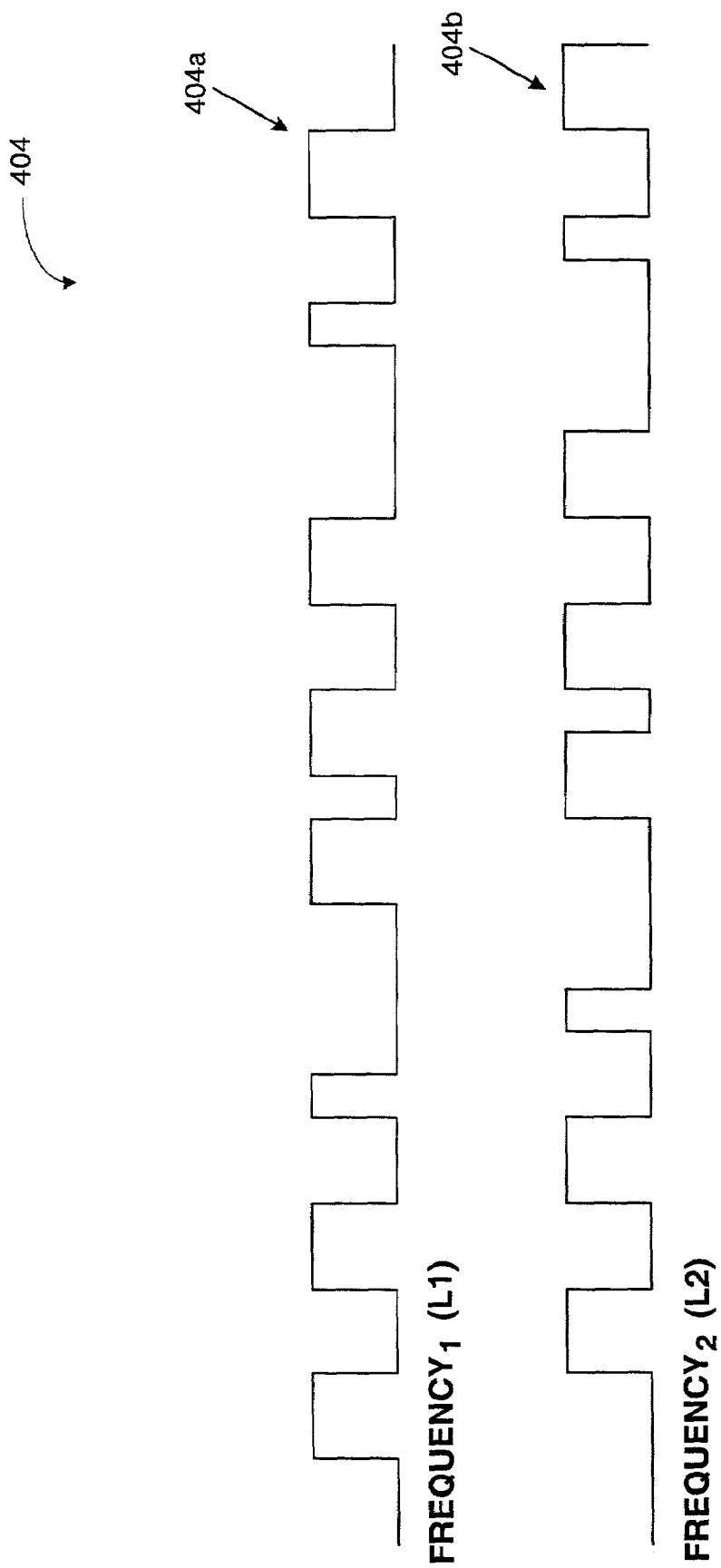
FIG. 5 is a timing diagram illustrating timing signals from a satellite of a GPS system.

FIG. 5 is a timing diagram illustrating timing signals 404 from a satellite of a GPS system. The timing signals 404 include a first timing signal 404a at a first frequency and second timing signal 404b at a second frequency. As FIG. 5 illustrates, the first and second timing signals 404a and 404b are offset from each other as a result of atmospheric variances. The delay of a radio signal is inversely proportional to the square of the carrier frequency (i.e. L2 will be delayed more than L1) and proportional to the total number of electrons along the path from the satellite to the receiver. The total number of electrons will vary according to the current solar activity, time of day (at the receiver), and longitude and latitude of the receiver. It is known to one practiced in the art that by measuring the delay between signals L1 and L2 from a particular satellite, one can calculate the effect due to the ionosphere and troposphere and correct for the variation, thereby improving positional accuracy. To compensate for the atmospheric variances, the embodiments of the present invention normalize the first and second timing signals 404a and 404b before determining geophysical location. As a result, accuracy for the location calculation is greatly improved.

In addition, embodiments of the present invention utilize the variances in timing signals 404 as a source for an unpredictable random number. In particular, measurement of the fluctuation in timing signal delay produces a random and unpredictable number whose value depends on the moment to moment value of the various parameters along the path from the satellite to the receiver. Therefore, this delay is specific to each satellite 402 and receiver 412 at a specific time and a specific location, and is extremely difficult, if not impossible, to calculate remotely. Moreover, each GPS satellite is continually moving along its orbit, thereby introducing additional delay variations as different parts of the Earth's atmosphere are sequentially interposed between the satellite and the receiver on the receiver antenna 412 on the User Card 410. This adds an additional element of variability and unpredictability which extends beyond just variations in the atmospheric line-of-sight conditions. Hence, essentially the only way to obtain such a delay is by direct measurement at the specific receiver on the User Card 410.

In some embodiments, the differences in the arrival times of the timing signal pulses 404 at the difference frequencies are measured. Since these differences are random, fluctuating, and unpredictable due to a wide variety of atmospheric, orbital and solar variables, this delay is unique to the precise time, date, and location of the receiver 412, and specific satellite timing signal 404 being received. Therefore, by measuring and storing the random delay as one or more numbers in memory of the User Card 410, another layer of "entropy" is added the overall system security, resulting in increased protection.

Entropy is a highly effective means of achieving strong encryption. In addition to the timing signal delay discussed above, a "secret" is another example of an entropy element that the embodiments of the present invention utilize to increase system security. A "secret", as used in the industry, is a piece of information known only to the user 408 or specific local User Card 410. A properly chosen "secret" makes it very difficult, if not impossible, for an outside party to guess the value of the secret. An example of a "secret" is a personal identification number (PIN) or passphrase. Because the introduction of such a non-predictable item adds randomness and uncertainty to the system, such a technique is said to add entropy to the system, resulting in dramatically increased overall security.

Referring back to FIG. 4, embodiments of the present invention can utilize four or more satellites 402 when acquiring timing signals 404. By using additional satellites 402, consistency can be checked and any errors discarded. Moreover, the embodiments of the present invention utilize various signal processing techniques and weak signal extraction to provide strong signal acquisition deep within buildings or in urban canyons, where the visibility of the sky is limited or missing entirely. Exemplary signal processing techniques utilized by embodiments of the present invention include Differential GPS (DGPS), Wireless Aided GPS (WAG), repeater systems, and methods of phase sensitive detection, each of which are known to those skilled in the art.

Figure 6:
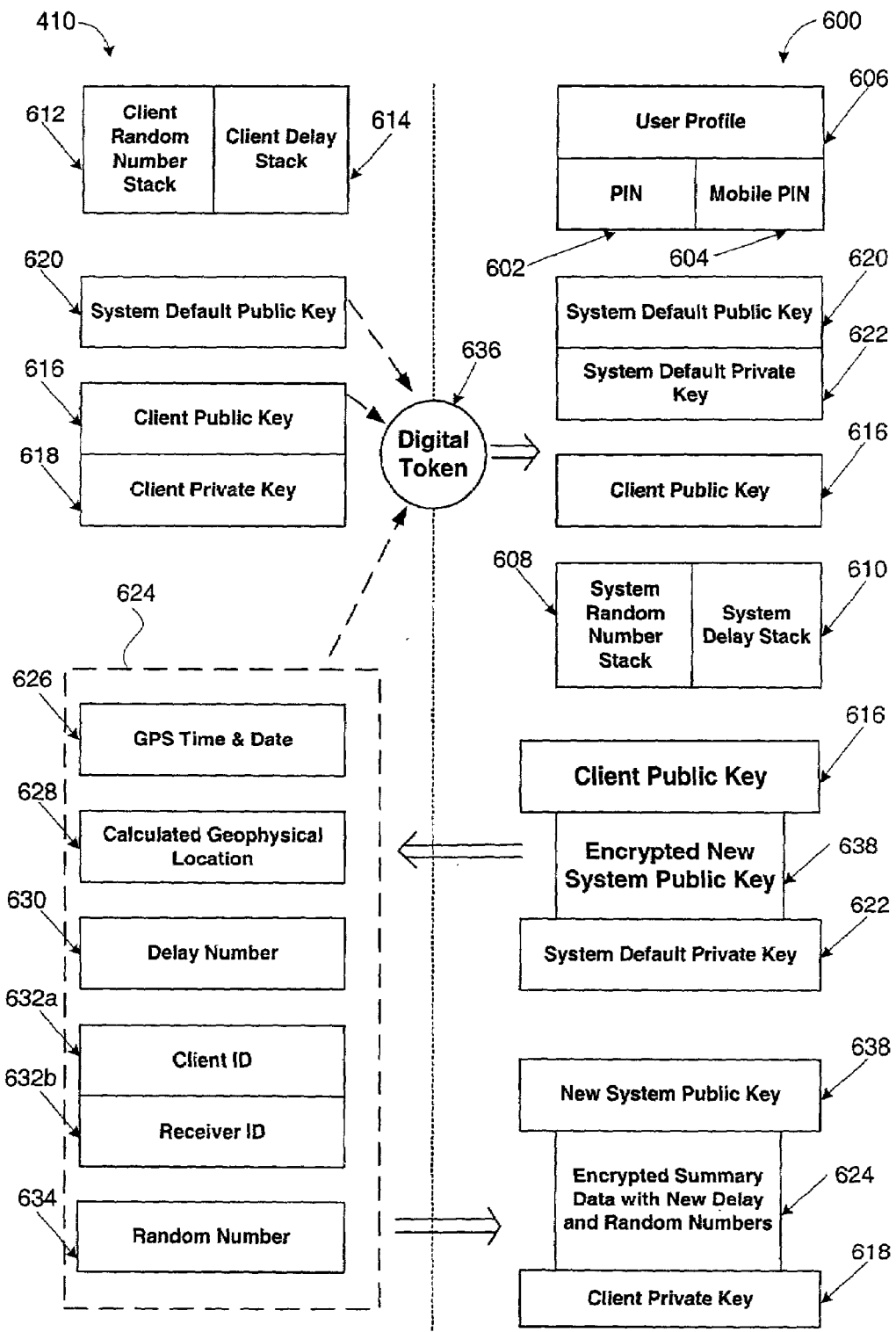
FIG. 6 is a block diagram showing a real-time digital authentication system, in accordance with an embodiment of the present invention.

FIG. 6 is a block diagram showing a real-time digital authentication system, in accordance with an embodiment of the present invention. The real-time digital authentication system includes User Card 410 on a client computer 409 and System Card 600. As discussed in greater detail subsequently, the real-time digital authentication system employs a combination of remote, personal, and local elements in such a manner as dramatically increase the security and protection of the system. In particular, the presence of elements whose values are not predictable from the outside add "entropy" to the security process and therefore dramatically increase the difficulty of hacking, breaking, deciphering or otherwise "spoofing" the system.

Figure 7:
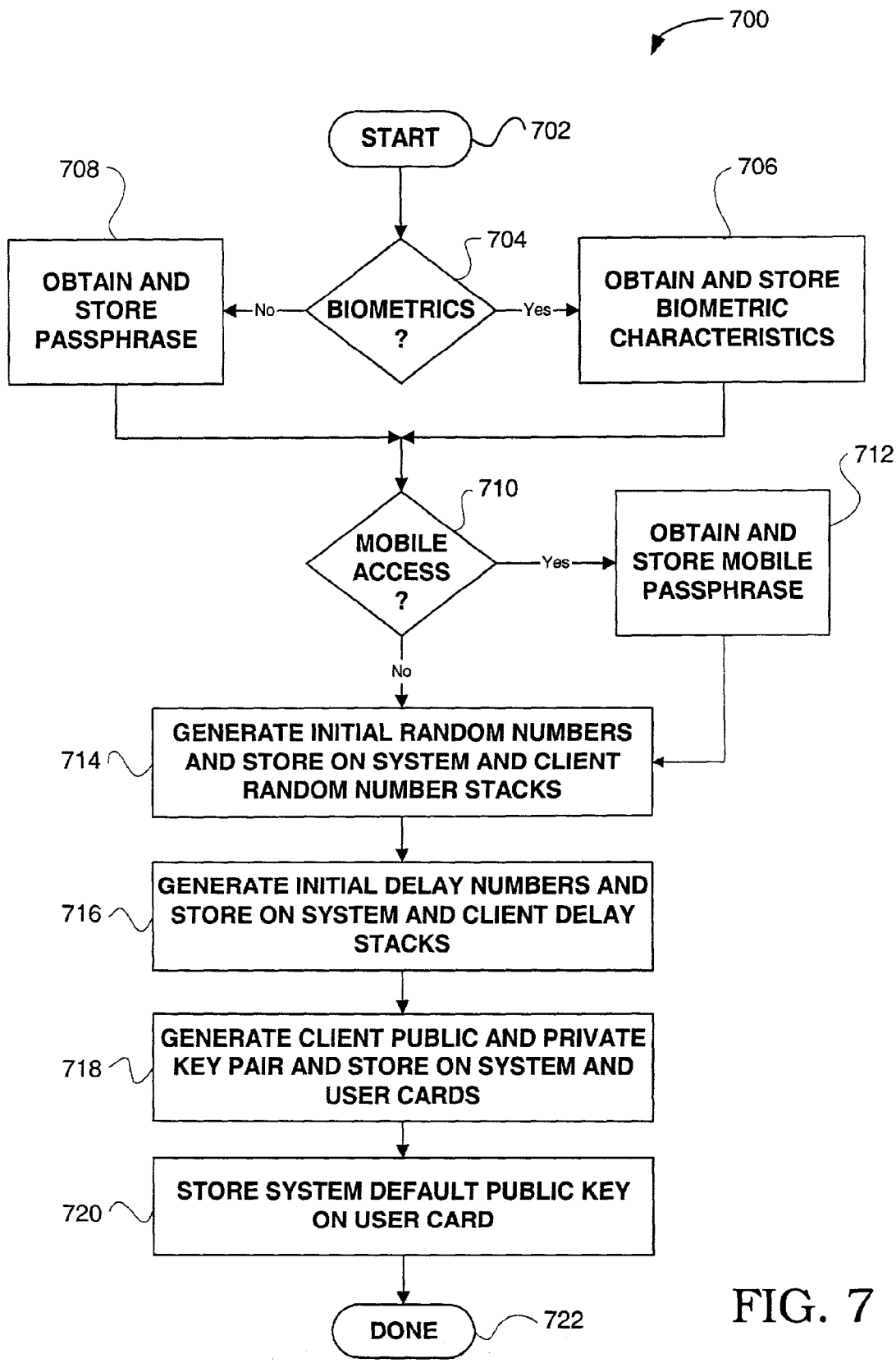
FIG. 7 is a flowchart showing a method for initializing a real-time digital authentication system, in accordance with an embodiment of the present invention.

Upon initial use of the real-time digital authentication system, or whenever a new user is added, an initialization process is invoked. FIG. 7 is a flowchart showing a method 700 for initializing a real-time digital authentication system, in accordance with an embodiment of the present invention. In an initial operation 702, preprocess operations are performed. Preprocess operations include creating system default public and private keys, provisioning the communication network between the server and client computers, and other preprocess operations that will be apparent to those skilled in the art.

A decision is made as to whether the authentication will include biometric data, in operation 704. Biometric data includes fingerprint scans, voiceprints, retinal scans, and hand measurements, and other biometric data as will be apparent to those skilled in the art. In this disclosure, biometric data is also meant to include any form of input/output in which the user is required to interact physically with a device (the User Card, a biometric scanner, or other device) which is attached to the host system. This might include, for example, a keypad on the User Card into which the user must enter their PIN or passphrase. As will be seen below, the requirement that the user interact directly with a piece of hardware that is resident on the host machine during the time of authentication eliminates the risk of a user employing any of a number of remote control programs to enter data remotely without being physically present at the authorized machine. If the authentication operations will include biometric data, the method 700 proceeds to operation 706. Otherwise, the method 700 continues with operation 708.

In operation 706, biometric characteristics are obtained from the user. Each user establishes a personal profile of their biometric characteristics, generally, by submitting themselves to a biometric scanning device. This profile is used to control the user's access to the authentication system or machine, as is preferred by the particular system or application employing the device. A preferred embodiment will require that the user interact directly with the biometric access device or other input/output interface that resides solely on the User Card or the user's computing device during the authentication process. This forces the user to be physically present at their machine during the authentication process, and avoids masquerading or other remote access attempts using various remote control programs available on the market today.

A passphrase or PIN is obtained from the user in operation 708. Generally, the passphrase or pin number is known only to the individual user and is not disclosed to others. Referring back to FIG. 6, a summary of the passphrase or PIN, or a brief hash sequence of the biometric characteristics, or combination of these is stored on the System Card 600, shown as PIN data 602 within the profile 606 in FIG. 6. If desired, a system administrator can confirm the user's identity. The system administrator can further "seal" to the profile by indicating who the administrator is, the time, date, and location of the initialization, and any additional unique information required by the application.

Turning back to FIG. 7, a decision is then made as to whether mobile access will be available to the user, in operation 710. Mobile access allows authentication of the user when the user is not at a registered location. If mobile access will be available to the user, the method 700 continues with operation 712. Otherwise, the method 700 proceeds to operation 714.

In operation 712, a mobile passphrase is obtained from the user. As explained in greater detail subsequently, the mobile passphrase is utilized by the user when accessing the system from a location other than a pre-registered location stored on the System Card in the user's profile. The mobile passphrase 604 is then encrypted and stored in the user's profile 606 on the System Card 600, as shown in FIG. 6. A preferred embodiment of the mobile passphrase will require the user to interact directly with the User Card or a biometric access device on their mobile computing machine, so that the user is required to be physically present at their machine during the time of authentication. As explained above, this requirement eliminates the risk of someone using a remote control program to spoof the location determination.

Referring back to FIG. 7, initial random numbers are generated and stored on a system random number stack in the user's profile, in operation 714. Similarly, initial delay numbers are generated and stored on a system delay stack in the user's profile, in operation 716. Turning to FIG. 6, the system random number stack 608 is used to store random numbers utilized in authentication. Similarly, the system delay stack 610 is used to store random delay numbers from satellite timing signals. At initialization, the system administrator generates the numbers for the random number stack 608 and system delay stack 610. During use, the particular User Card 410 will generate new numbers for the random number stack 608 and system delay stack 610. Copies of the initial numbers for the random number stack 608 and system delay stack 610 of the System Card 600 are stored in the client random number stack 612 and client delay stack 614 of the User Card 410 at the time of initialization.

Referring back to FIG. 7, in operation 718, a public and private key pair is generated for the User Card 410 on the client computer 409. As shown in FIG. 6, the client public key 616 and client private key 618 are both stored on the User Card 410. In addition, the client public key 616 is stored in a database on the System Card 600. The client public key 616 and client private key 618 are used for encryption, as discussed in greater detail subsequently.

The system default public key 620 is then stored on the User Card 410, as shown in operation 720 of FIG. 7. In the real-time digital authentication system of FIG. 6, the System Card stores a system default public key 620 and a system default private key 622. The system default private key 622 is kept confidential on the System Card 600. However, the system default public key 620 is distributed to the User Card 410 that will access information or data on the server computer through the System Card 600. Post process operations are then performed in operation 722. Post process operations can include additional verification of the user identity, initialization of additional users, and other post process operations that will be apparent to those skilled in the art.

When the user desires to authenticate a file, electronic transaction, or other form of electronic action, the commencement of the authentication process can occur in a variety of ways without limiting the functionality of the device. For example, using a Graphical User Interface ("GUI") the operator can employ a sequence of mouse clicks to initiate the authentication process. Also, a specific sequence of keystrokes, such as ALT-A or some other combination can initiate the process. It is important to note that the system can be configured to either always authenticate each transaction, for security-intense applications such as database transactions in the healthcare industry, or be user-enabled, leaving the decision to authenticate up to the user. Once commenced, the embodiments of the present invention obtain summary data for the client computer, as discussed next with reference to FIG. 8.

Figure 8:
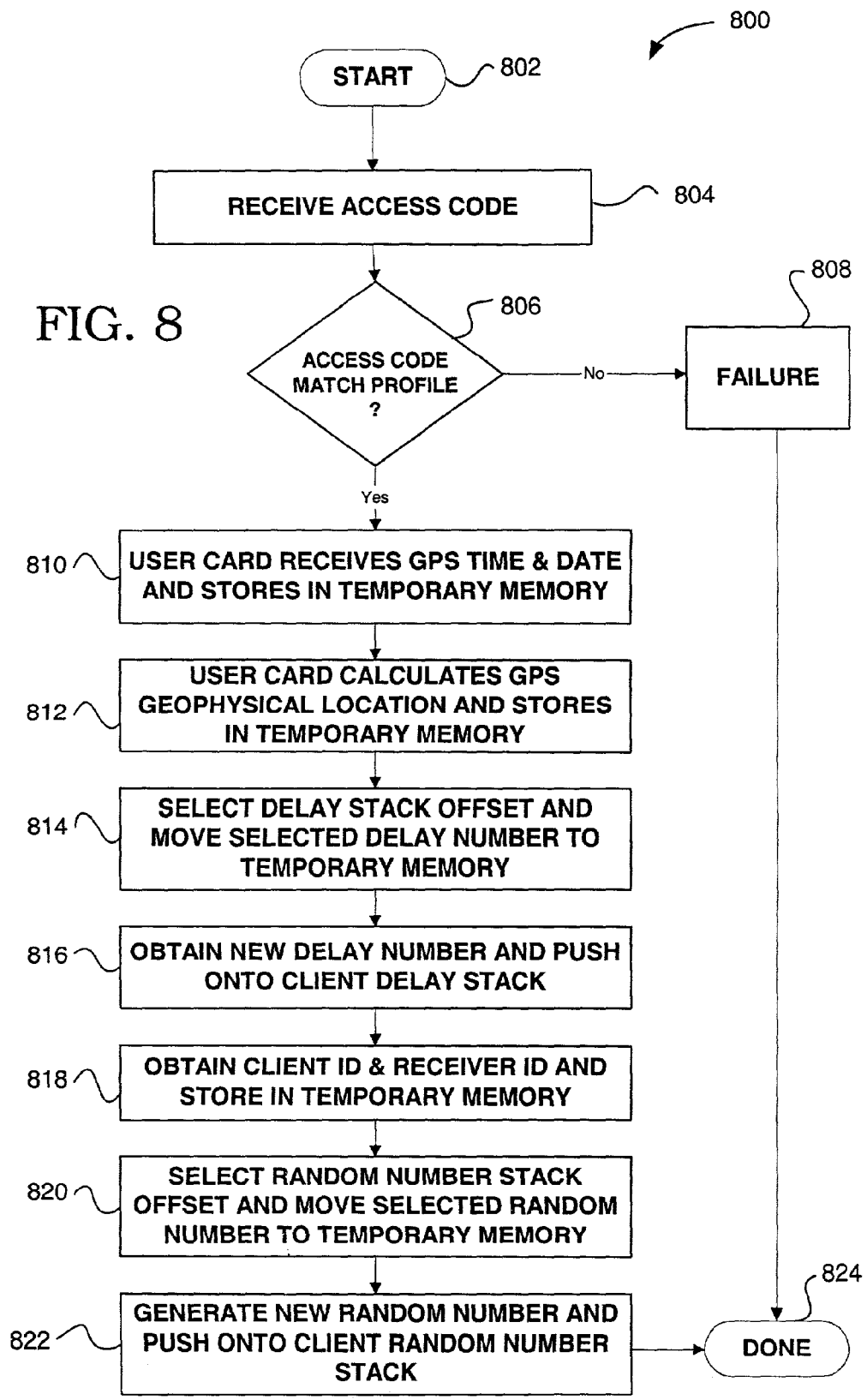
FIG. 8 is a flowchart showing a method for obtain summary data including GPS entropy data, in accordance with an embodiment of the present invention.

FIG. 8 is a flowchart showing a method 800 for obtaining summary data including GPS entropy data for the purpose of authenticating a document or file, or authenticating a user prior to granting access to information or systems, in accordance with an embodiment of the present invention. In an initial operation 802, preprocess operations are performed. Preprocess operations can include initialization of the user profile, creation of a file or transaction to be authenticated, and other preprocess operations that will be apparent to those skilled in the art.

In operation 804, the client device receives an access code from the user. The user is prompted to either enter their passphrase or PIN number. If biometric access is being used, the user is prompted to verify their identity through a biometric access device. The summary of the user's biometric characteristics is then be encrypted and compared against the encrypted profiles stored on the User Card or the System Card.

A decision is then made as to whether the received access code matches the data in the encrypted profiles stored on the User Card or the System Card, in operation 806. In some embodiments, failure to match the profile information will result in a limited number of retries before access is completely denied, in operation 808. If the access code matches the data in the encrypted profiles stored on the User Card or the System Card, the method 800 continues with operation 810.

In operation 810, GPS time and date data is received and stored in temporary memory. In one embodiment, the GPS receiver is activated and the time and date are obtained, as described previously, and stored in a temporary memory area on the User Card. Referring to FIG. 6, the User Card 410 includes a temporary memory 624 that is used to temporarily store summary data. The data in the temporary memory 624 is incorporated into the regular memory of the User Card 410 once authentication of the user has been completed by the challenge/response process that occurs between the User Card 410 and the System Card 600. In operation, time, date, location, device id, User Card id, newly calculated random number and the current measured delay number are all stored in the temporary memory 624 on the User Card 410. Once authentication has been established, the user is granted access to data that resides behind the System Card 600. Alternatively, a local Digital Certificate is created for later authentication as described in greater detail subsequently with reference to FIGS. 9 and 10.

In operation 812, the User Card 410 calculates the geophysical location of the client computer 409 using the GPS timing signals received by the GPS antenna 412. The User Card 410 uses the GPS timing signals to determine the precise geophysical location at that moment, and the geophysical location 628 is stored in temporary memory 624. Since the motion of the GPS satellites is highly complex, duplication of such timing signals by a fake source is essentially unfeasible.

A delay stack offset is determined and the delay number located at the stack offset in the client delay stack is copied to temporary memory, in operation 814. As shown in FIG. 6, the client delay stack 614 includes a plurality of delay numbers. In operation 814, an offset into the client delay stack 614 is determined via a random number or other appropriate manner as will be apparent to those skilled in the art. The offset is then used to index the delay number located at the offset within the client delay stack 614. The selected delay number 630 is then copied to the temporary memory 624.

Referring back to FIG. 8, a new delay number is obtained from the GPS timing signals, in operation 816. Embodiments of the present invention utilize the variances in GPS timing signals as a source for an unpredictable random number. In particular, measurement of the fluctuation in timing signal delay produces a random and unpredictable number whose value depends on the moment to moment value of the various parameters along the path from the satellite to the receiver. Therefore, this delay is specific to each satellite and receiver at a specific time and a specific location, and is extremely difficult, if not impossible, to calculate remotely. Hence, essentially the only way to obtain such a delay is by direct measurement at the specific receiver.

In some embodiments, the differences in the arrival times of the timing signal pulses at the difference frequencies are measured. Since these differences are random, fluctuating and unpredictable due to a wide variety of atmospheric and solar variables, this delay is unique to the precise time, date, and location of the receiver, and specific satellite timing signal being received. The newly obtained delay number is then pushed on the client delay stack 614.

The unique host processor client ID and User Card ID 410 are copied to temporary memory, in operation 818. Each client computer 409 includes a unique host processor client ID 632 and receiver ID 634 from the receiver coupled to the client computer 409. These IDs are added to temporary memory 624 to further uniquely identify the user.

A stack offset is determined and the previously stored random number located at the client random number stack offset in the client random number stack is copied to temporary memory, in operation 820. As shown in FIG. 6, the client random number stack 612 includes a plurality of previously stored random numbers. In operation 820, an offset into the client random number stack 612 is determined, and the offset is then used to index the previously stored random number located at the offset within the client random number stack 612. The selected previously stored random number 634 is then copied to the temporary memory 624.

Referring back to FIG. 8, a new random number is generated and pushed onto the client random number stack 612, in operation 822. The new random number can be generated by well known techniques that will be apparent to those skilled in the art. Post process operations are performed in operation 822. Post process operations can include creating a Digital Certificate using the obtained summary information, authenticating a transaction using the obtained summary information, and other post process operations that will be apparent to those skilled in the art. The process described in FIG. 8 is meant to be instructive. It will be apparent to those skilled in the art that the selection of the delay and random numbers that are copied into temporary memory need not be limited to one each. Multiple randomly selected entries from the random number stack as well as multiple randomly selected delay numbers from the delay number stack can be employed as part of the creation of the summary information, further strengthening the integrity of the process by raising the complexity and entropy higher.

Figure 9:
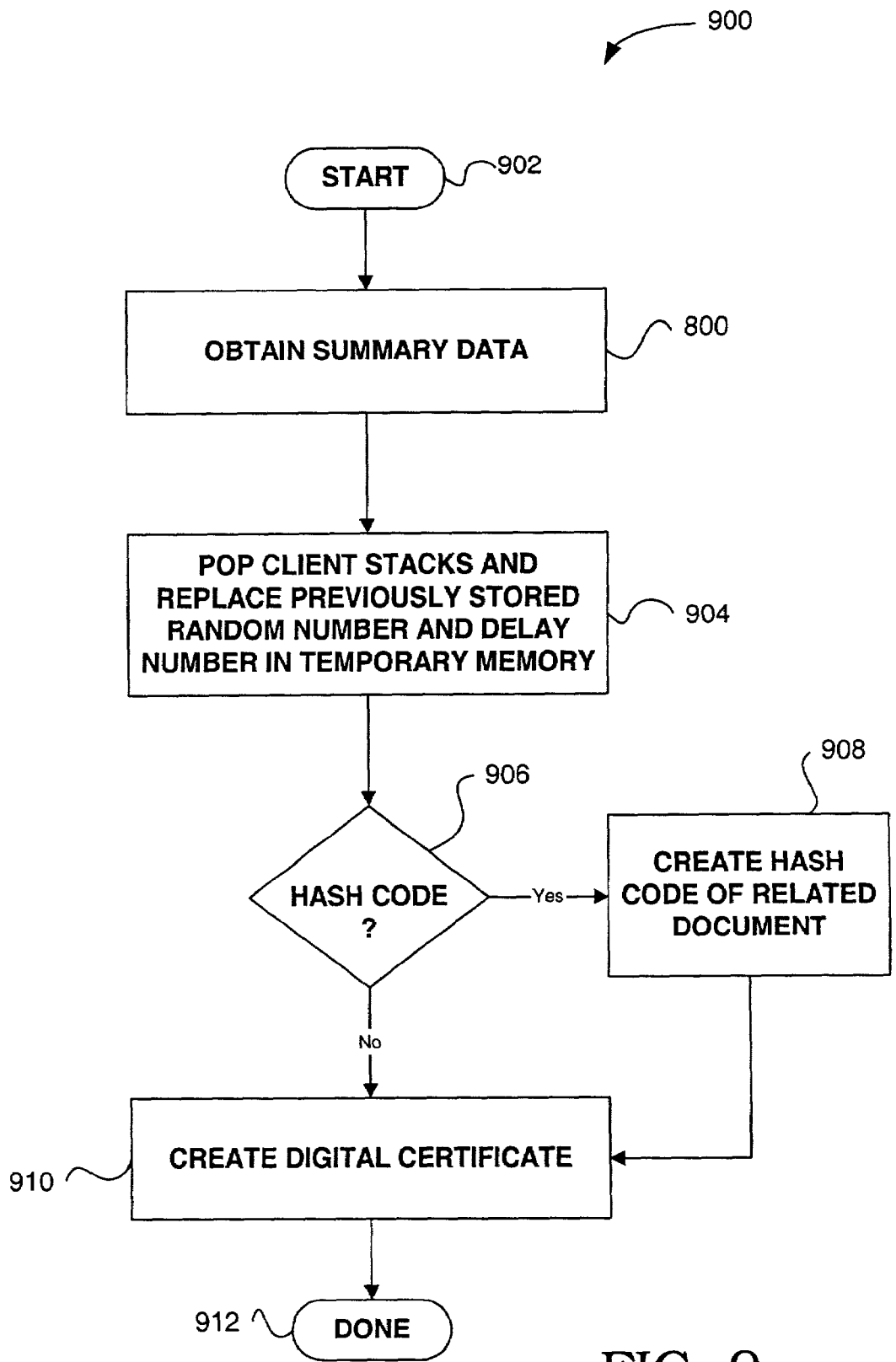
FIG. 9 is a flowchart showing a method for creating a Digital Certificate using obtained client summary information, in accordance with an embodiment of the present invention.

FIG. 9 is a flowchart showing a method 900 for creating a Digital Certificate using obtained client summary information, in accordance with an embodiment of the present invention. In an initial operation 902, preprocess operations are performed. Preprocess operations can include initializing a new user profile, provisioning a new client computer system, and other preprocess operations that will be apparent to those skilled in the art.

In operation 800, summary data including GPS entropy data is obtained. Summary data is obtained as discussed previously with respect to method 800 of FIG. 8. The obtained summary data is stored in temporary memory 624 and the client random number stack 612 and the client delay stack 614 are updated as discussed above.

In operation 904, the client random number stack and the client delay stack are popped and the old random number and old delay number in temporary memory are replaced with the new random number and new delay number popped off the temporary memory of the User Card. In this manner, the new random number and new delay number can be used for the creation of the Digital Certificate while keeping the client stacks 612 and 614 synchronous with the server stacks 608 and 610.

A decision is then made as to whether a hash code of the related document is to be included with the Digital Certificate, in operation 906. If a hash code of the related document is to be included with the Digital Certificate the method 900 proceeds to operation 908. Otherwise, the method 900 continues with operation 910.

In operation 908, a hash code is created for the related document. The hash code function converts a variable-sized amount of text into a fixed-sized output, or hash value. As a result, the hash code allows changes to be detected if the related document is changed.

The Digital Certificate is then created in operation 910. The client public key 616 is used in conjunction with the client private key 618 to encrypt the summary data in the temporary memory 624 using PKI dual key encryption. The resulting Digital Certificate can then attest to the time, date, location, user, processor ID, receiver ID, new delay number, and new random number. If a hash code of the related document was created in operation 908, the hash code can be used subsequently to detect any changes to the related document content since certification. Post process operations are then performed in operation 912.

Post process operations include storing the Digital Certificate and related file on a storage medium, subsequent authentication operations, and other post process operations that will be apparent to those skilled in the art. In addition to facilitating Digital Certificate creation, the summary data can be used in transactions wherein a transmission is to occur, as discussed in greater detail next with reference to FIG. 10.

Figure 10:
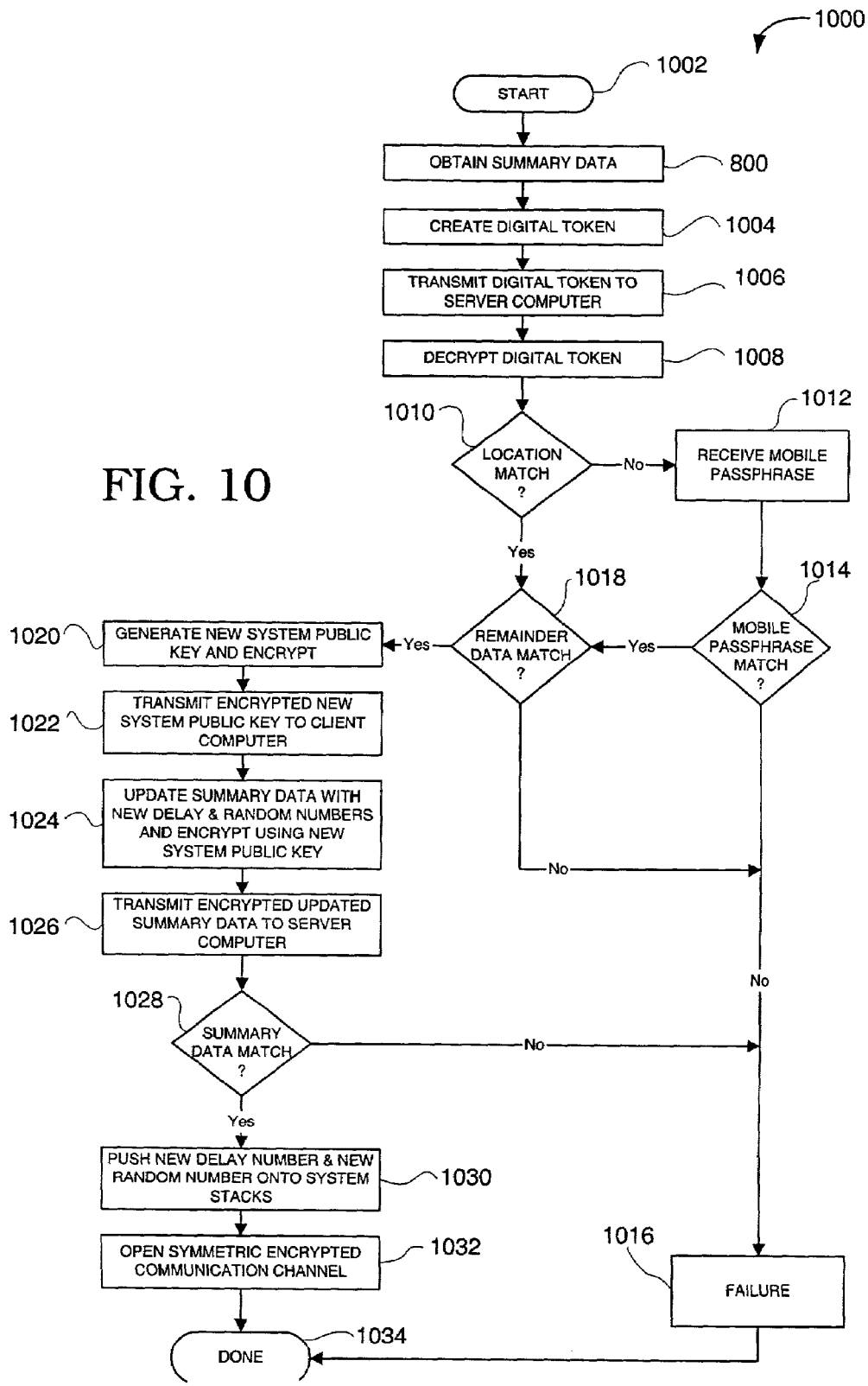
FIG. 10 is flowchart showing a method for authenticating a remote transaction, in accordance with an embodiment of the present invention.

FIG. 10 is flowchart showing a method 1000 for authenticating a remote transaction, in accordance with an embodiment of the present invention. In an initial operation 1002, preprocess operations are performed. Preprocess operations include establishing a connection with a remote server computer, commencing the transaction application, and other preprocess operations that will be apparent to those skilled in the art.

In operation 800, summary data including GPS entropy data is obtained. Summary data is obtained as discussed previously with respect to method 800 of FIG. 8. The obtained summary data is stored in temporary memory 624 and the client random number stack 612 and the client delay stack 614 are updated as discussed above.

A digital token is created in operation 1004. As shown in FIG. 6, the User Card 410 uses the system default public key 620 in conjunction with the client private key 618 to encrypt the summary data stored in the temporary memory 624 into a digital token 636. For example, in FIG. 6 the summary data includes the GPS time and date 626, the calculated geophysical location 628, the selected previously stored delay number 630, the selected previously stored random number 634, the client ID 632a, and the receiver ID 632b. It should be borne in mind that the digital token 636 is not required to include all the information stored in temporary memory 624. In some embodiments, some amount of summary information less than all the information shown in the temporary memory 624 of FIG. 6 is encrypted into the digital token 636.

Referring back to FIG. 10, the digital token is transmitted to the server computer in operation 1006. Upon receipt, the server computer decrypts the digital token, in operation 1008. As illustrated in FIG. 6, the server computer 600 decrypts the digital token 636 using the system default private key 622. The server computer 600 then compares the summary data included in the digital token 636 to the data included in the user profile 606.

A decision is then made as to whether the GPS geophysical location data included in the digital token matches the GPS geophysical location data included in the user profile, in operation 1010. If the GPS geophysical location data included in the digital token matches the GPS geophysical location data included in the user profile, the method 1000 continues with operation 1018. Otherwise, the method 1000 branches to operation 1012.

In operation 1012, the System Card requests a mobile passphrase for the user. More specifically, the System Card encrypts a token using the system default private key and the client's public key. When decrypted, the contents of the token request that the User Card challenge the user for his/her mobile passphrase. The User Card issues a request to the Host Processor and the user is presented with a dialog box requesting that the mobile passphrase that was established during initialization be entered. The passphrase entered by the user is then returned to the User Card, which encrypts the response into a token using the system default public key and its client private key. Upon receipt, the System Card decrypts the token and compares the passphrase against the passphrase stored in the user's profile.

When the geophysical location data for the user does not match the profile, the transaction can still be authenticated if the user is approved for mobile access. Hence, in operation 1012, the user is prompted for their mobile passphrase. A decision is then made as to whether the mobile passphrase matches the mobile passphrase stored in the user's profile, in operation 1014. If the mobile passphrase matches the mobile passphrase stored in the user's profile, the method 1000 continues with operation 1018. Otherwise, the method 1000 continues with an authentication failure operation 1016. In the authentication failure operation 1016, access to the server computer is denied and the system administrator is notified to take any subsequent actions that have been instituted by the organization.

In operation 1018, a decision is made as to whether the remainder of the summary data included in the digital token matches the data included in user's profile. For example, the client ID and receiver ID can be validated. In addition, the delay number 630 and random number 634 included in the digital token are compared to the corresponding delay number and random number stored in the system delay stack 610 and system random number stack 608 at the same offsets used for the digital token data. This stack offset check further increases system security since system attackers would need to know both the actual random and delay numbers included in the stacks and the offsets used to index into the stacks. If the remainder of the summary data included in the digital token matches the data included in user's profile, the method 1000 continues with operation 1020. Otherwise, the method 1000 branches to the authentication failure operation 1016. As explained above, it is not the intent of this example to limit the use of random number and delay number offsets to just one. Multiple offsets can comprise a challenge to further strengthen the authentication process against attacks.

In operation 1020, a new system public key is generated and encrypted. As shown in FIG. 6, the server computer 600 uses the client public key 616 in conjunction with the system default private key 622 to encrypt the new system public key 638. The encrypted new system public key 638 is then transmitted to the client computer 410, in operation 1022.

The new random number and new delay number are copied into temporary memory and the summary data in temporary memory is encrypted using the new system public key, in operation 1024. Referring to FIG. 6, the client computer 410 replaces the previously stored delay number 630 and the previously stored random number 634 in temporary memory 624 with the new random number and new delay number copied from the client random number stack 612 and client delay number stack 614. The client computer 410 then encrypts the updated summary data in temporary memory 624 using the new system public key 620 in conjunction with the client private key 618. Referring back to FIG. 10, the encrypted updated summary data is transmitted to the server computer in operation 1026. The server computer then uses the system private key 622 to decrypt the summary data and compares the summary data to the data included in the user's profile 606.

A decision is then made as to whether the received summary data, excluding the new delay and random numbers, matches the data stored in the user's profile, in operation 1028. If the summary data, excluding the new delay and random numbers, matches the data stored in the user's profile, the method 1000 continues with operation 1030. Otherwise, the method branches to the authentication failure operation 1016.

In operation 1030, the new delay number and the new random number included in the updated summary data are pushed onto the system stacks. Referring to FIG. 6, the new delay number 630 included in the updated summary data 624 is pushed onto the system delay stack 610. Similarly, the new random number 634 included in the updated summary data 624 is pushed onto the system random number stack 608.

Referring back to FIG. 10, a symmetric encrypted channel is then opened in operation 1032. A high speed symmetric encrypted channel is opened between the client computer 410 and the server computer 600. High speed encrypted communication is then permitted using a secure encryption technique, such as Security Sockets Layer (SSL), Data Encryption Standard (DES), Rijndael, or any other high speed encryption technique known to those skilled in the art.

To complete synchronization of the system and user stacks, the System Card sends an authentication acknowledgment to the User Card through the symmetric encrypted channel. Upon receipt of the authentication acknowledgment message from the System Card, the User Card pops the new random number(s) and delay number(s) from the temporary memory location and pushes them onto their respective stacks. In this way, the System and User stacks remain synchronized and are updated with each successive authentication.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for digital authentication, comprising the operations of:
   receiving a first timing signal from a remote source using a receiver;
   receiving a second timing signal from the remote source using the receiver;
   storing a delay number, the delay number being a measure of a variation between arrival times of the first timing signal and the second timing signal at the receiver; and
   authenticating a digital transaction using the delay number.

2. A method as recited in claim 1, further comprising the operation of creating a digital certificate using the delay number.

3. A method as recited in claim 1, wherein the remote source is a global positioning satellite (GPS) system.

4. A method as recited in claim 1, wherein the remote source is a cell tower system.

5. A method as recited in claim 1, wherein the variation between arrival times of the first timing signal and the second timing signal is caused by free electrons in a line of sight between the remote source and the receiver.

6. A method as recited in claim 5, wherein the variation between arrival times of the first timing signal and the second timing signal is further caused by variations in atmospheric conditions.

7. A method as recited in claim 1, further comprising the operation of calculating a location of the client computer based on at least the first timing signal.

8. A method as recited in claim 1, further comprising the operations of:
   storing the delay number on a User Card and a System Card;
   authenticating a transaction between the User Card on a client computer and the System Card on a server computer by comparing the delay number stored on the User Card to the delay number stored on the System Card; and
   allowing the transaction to occur if the authentication is successful.

9. A method as recited in claim 8, further comprising the operations of:
   updating the delay number stored on the User Card based on a second delay time period between when a second timing signal from the remote source was transmitted and when the second timing signal was received; and
   updating the delay number stored on the System Card based on the updated delay number stored on the User Card.

10. A method as recited in claim 9, wherein the transaction is further authenticated by comparing the location of the client computer with data from a profile stored on the server computer.

11. A method as recited in claim 10, further comprising the operation of receiving a mobile access code when the location of the client computer does not match location data in the profile.

12. A method as recited in claim 11, wherein the transaction is further authenticated by comparing the received mobile access code with a mobile access code data from the profile.

13. A method for digital authentication, comprising the operations of:
   storing a profile on a System Card, the profile including a first delay number, the first delay number being a measure of a first variation between arrival times of a first timing signal and a second timing signal received from a remote source;
   transmitting a digital token from a User Card to the System Card, the digital token including the first delay number;
   sending a new server public encryption key from the System Card to the User Card if the digital token matches the profile;
   communicating summary data from the User Card to the System Card, the summary data including a second delay number, the second delay number being a measure of a second variation between arrival times of a third timing signal and a fourth timing signal received from the remote source, the second summary data being encrypted via the new server public encryption key; and
   updating the profile on a System Card, the profile including the second delay number.

14. A method as recited in claim 13, wherein the digital token is encrypted for transmission using a default server public encryption key.

15. A method as recited in claim 14, wherein the new server public encryption key is encrypted for transmission using the default server public encryption key.

16. A method as recited in claim 13, wherein the remote source is a cell tower system.

17. A method as recited in claim 13, wherein the remote source is a global positioning satellite (GPS) system.

18. A method as recited in claim 17, wherein the first variation and the second variation are caused by free electrons in a line of sight between the remote source and the receiver.

19. A method as recited in claim 13, wherein the profile further includes location data for the User Card.

20. A method as recited in claim 19, further comprising the operation of calculating a location of the User Card based on the second timing signal.

21. A method as recited in claim 19, wherein the digital token includes the calculated location of the User Card.

22. A system for digital authentication, comprising:
   a client computer having a User Card capable of receiving a first timing signal and a second timing signal from a remote source, wherein the User Card includes a stored delay number that is a measure of a variation between arrival times of the first timing signal and the second timing signal at the User Card; and a server computer having a System Card that includes the delay number, the System Card including logic to compare the delay number stored on the User Card to the delay number stored on the System Card to authenticate a transaction.

23. A system as recited in claim 22, wherein the System Card includes logic to allow the transaction to occur if the authentication is successful.

24. A system as recited in claim 23, wherein the User Card includes logic to update the delay number stored on the User Card based on a measure of a variation between arrival times of a third timing signal and a fourth timing signal received from the remote source.

25. A system as recited in claim 24, wherein the System Card includes logic to update the delay number stored on the System Card based on the updated delay number stored on the User Card.

26. A system as recited in claim 25, wherein the remote source is a global positioning satellite (GPS) system.

27. A system as recited in claim 26, wherein the variations between arrival times of the timing signals are caused by variations in atmospheric conditions.

28. A system as recited in claim 22, wherein the User Card includes logic to calculate a location based on at least the first timing signal.

29. A system as recited in claim 28, wherein the System Card includes logic to compare the location of the User Card with data from a profile stored on the System Card.

30. A system as recited in claim 29, wherein the User Card includes logic to prompt the client computer to request a mobile access code from a user when the location of the User Card does not match location data in the profile.

31. A system as recited in claim 30, wherein the System Card includes logic to compare the mobile access code with a mobile access code data from the profile.

32. A system as recited in claim 22, wherein public key encryption is used to encrypt the transaction.

33. A system as recited in claim 22, wherein a user must physically interact with a device attached to the client computer to authenticate the transaction.

34. A system as recited in claim 33, wherein the device is a biometric scanner.

35. A system as recited in claim 33, wherein the device is a keypad.

* * * * *